United States Patent
Michelena

(10) Patent No.: US 6,721,407 B1
(45) Date of Patent: Apr. 13, 2004

(54) APPARATUS AND METHOD FOR IDENTIFYING A THIRD PARTY ENGAGED IN COMMUNICATION WITH A CALLED PARTY

(75) Inventor: Carlos Roberto Michelena, Coahuila (MX)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 506 days.

(21) Appl. No.: 09/710,417

(22) Filed: Nov. 9, 2000

(51) Int. Cl.[7] .............................................. H04M 1/56
(52) U.S. Cl. ........................ 379/142.08; 379/207.15; 379/207.02; 379/215.01
(58) Field of Search .............................. 379/45, 46, 49, 379/7, 35, 142, 208.01

(56) References Cited

U.S. PATENT DOCUMENTS 5,363,429 A    11/1994  Fujisawa ................... 455/415
6,208,726 B1 *  3/2001  Bansal et al. .......... 379/208.01
6,310,946 B1 * 10/2001  Bauer et al. ........... 379/208.01

* cited by examiner

Primary Examiner—Ahmad F. Matar
Assistant Examiner—Karen Le

(57) ABSTRACT

A method of identifying an other party associated with identifying information engaged in communication with a called party, includes the steps of: receiving a call for the called party, receiving an indication that the called party is engaged in communication with the other party, receiving a request for the identifying information; and receiving the identifying information. An apparatus for identifying a third party engaged in communication with a called party may include a node for receiving a call for the called party, receiving an indication that the called party is engaged in communication with the other party, receiving a request for the identifying information, and receiving the identifying information. The apparatus may also include a timer associated with a preselected timeout period.

20 Claims, 3 Drawing Sheets

APPARATUS AND METHOD FOR IDENTIFYING A THIRD PARTY ENGAGED IN COMMUNICATION WITH A CALLED PARTY

BACKGROUND OF THE INVENTION

1. Technical Field

This invention relates generally to communications between parties, and more particularly, to the presentation of information associated with one or more parties communicating within a telecommunications network. More particularly, the invention is related to apparatus and methods for caller identification services available to subscribers within such networks.

2. History of Related Art

Presently, calls between telephone customers in the United States are established on the basis of a numbering plan which requires each customer line to be identified by a ten-digit directory number, or calling party telephone number. The number comprises a three-digit area code defining a specific geographic region, followed by a three-digit office code identifying a particular central office which is, in turn, followed by a four-digit customer line identifier served by the central office.

Caller identification services have been available to telecommunications service subscribers for some time. Thus, when the calling party, having a ten-digit directory number or A-number attempts to contact the called party, also having a ten-digit directory number, or B-number, the A-number can be passed on to the telephonic communication device where the called party is located. The calling party name, which has previously been associated with the A-number, may then be displayed at the telephonic communication device of the called party. The device may be a separate apparatus in electronic communication with a desk-top telephone, or alternatively, fully-integrated into a telephone, such as a mobile cellular telephone. Primitive caller identification services merely present the calling party telephone number to the called party, without any calling party name.

Generally, caller identification services function adequately with respect to the called party subscriber. However, there are occasions when current implementations of the service do not effectively meet the needs of subscribers. For example, while it is possible for the called party (party B) to know the identity of a calling (party party A), it is not currently possible for a calling party (party A) to identify another party (party C) currently engaged in conversation with the called party (party B). In other words, if party B is engaged in conversation with party C, a potential calling party (party A) cannot know the identity of party C. The only indication party A receives in this instance is a busy signal, ringing, or possibly, some announcement indicating the occupation of party B with party C, and a request to leave messages with a voice mail service.

Therefore, what is needed is a method and apparatus for identifying another party engaged in communication with the called party. Such a method and apparatus may have many benefits, such as enabling a fire or police department employee to determine whether a "busy" telephone connection is already connected with another line of the emergency service. Other benefits include emergency verification of contact with an appropriate service provider, such as a fire station or police station. Further, if interrupting the telephone conversation is optional for a calling party, such a method and apparatus provides a mechanism for determining whether such an interruption is desirable.

SUMMARY OF THE INVENTION

The invention provides a mechanism for identifying a party (i.e., an "other party") currently engaged in communication with a called party, by a calling party. The invention operates whenever the calling party attempts to contact the called party engaged in conversation with an other party. In this case, the calling party receives an audio busy signal and has the option of activating the service by entering a feature code into his telephone. Entry of the feature code results in requesting the identity of the third party, which is returned to the calling party. Alternatively, the service may be provided automatically. In this case, the receipt of a busy signal (e.g. within a node serving the calling party) results in automatic transmission of the third party identity to the calling party after a selected time period. Thus, after hearing two "busy signals," the calling party may be presented with the identity of the third party automatically.

The invention includes a method of identifying an other party engaged in communication with a called party which comprises the steps of receiving a call for the called party from a calling party, receiving an indication that the called party is engaged in communication with the other party, receiving a request for identifying information associated with the other party, and sending the identifying information to the calling party. The request for identifying information may be implemented by entry of a feature code by the calling party or automatically within the network (assuming the service is always enabled). The identifying information may include a telephone number, a name, such as a business or personal name, or a location and a name.

Some of the steps in the method may be implemented by a node within the telecommunications network which serves the calling party. Thus the step of receiving a request for identifying information may include the step of receiving a preselected feature code from the calling party by the node. The step of sending the identifying information may include the step of sending the identifying information from the node to the calling party. Further, if automatic operation of the service is desired, the node may include a timer associated with a preselected time out period, and the step of sending the identifying information to the calling party may occur some time after the indication is received, as determined by the preselected timeout period.

Finally, the step of sending the identifying information to the calling party may include the step of sending a telephone number associated with the other party to the calling party. The step of sending the identifying information to the calling party may also include the step of sending a name, number, and/or location associated with the other party to the calling party.

The apparatus of the invention may include a node for receiving a call for the called party from the calling party, receiving an indication that the called party is engaged in communication with the other party, receiving a request for the identifying information, and receiving the identifying information. The node may also send the identifying information to the calling party. Further, the node may include a timer with a preselected timeout period which measures the time between receiving the indication that the called party is engaged in communication with the other party, and receiving the request for the identifying information. The timer may also be used to count a number of events received to indicate that the called party is engaged in communication with the other party (such as a busy signal).

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
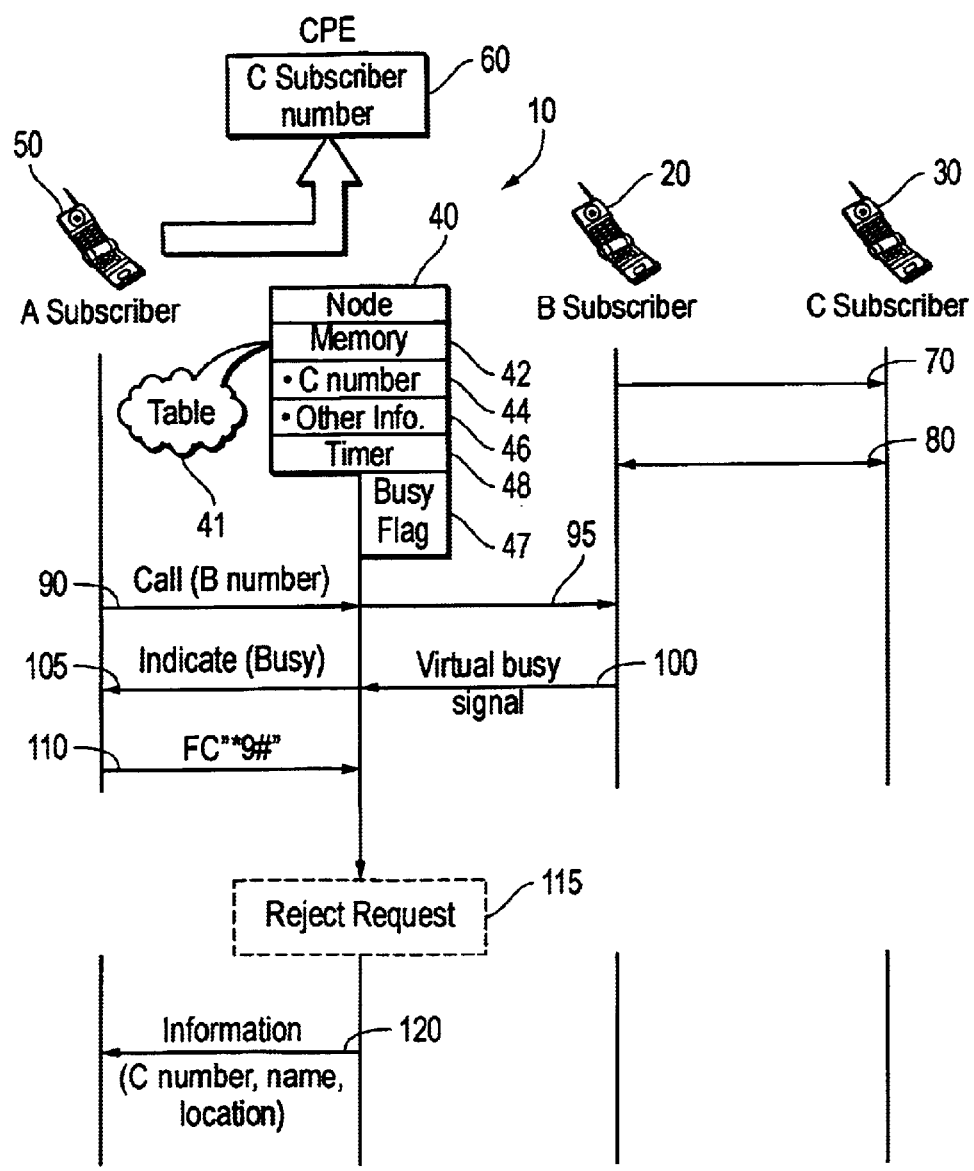
FIG. 1 is a network operational diagram illustrating an embodiment of the method of the present invention.

The invention provides a new method and apparatus to identify third parties engaged in communication with a called party. Thus, a calling party can easily determine, even if call-waiting is not available, with whom the called party is speaking or communicating. Turning now to FIG. 1, a network operational diagram illustrating an embodiment of the method of the present invention can be seen. In this case, a telecommunications network 10 comprises several telephonic communications devices (which may be a stationary telephone, a mobile cellular telephone, or some form of Customer Premises Equipment (CPE)) operated by network service subscribers to the network services. In this particular case, the telephone 50 is operated by the A subscriber (the calling party), the telephone 20 is operated by the B subscriber (the called party), and the telephone 30 is operated by the C subscriber (the "other" party). By way of illustration and not limitation, the A, B, and C subscribers interact with each other through a node 40, such as a Mobile Switching Center or telephone exchange, which is also part of the telecommunications network 10.

Typically, the B subscriber will use the telephone 20 to call the C subscriber at the telephone 30 in step 70. Assuming that the C subscriber answers the call, the B subscriber will then be engaged in communication with the C subscriber in step 80. It should be noted that, if the C subscriber has a call-waiting service activated, the telephone number and/or name identity of the B subscriber, in the form of Called Identity Delivery Information, has been sent to the node 40, and re-transmitted to the C subscriber before the call connection is completed in step 80. Thus, conventional caller identification services enable the C subscriber to identify the B subscriber before either party is engaged in communication with the other. At this time, the A subscriber (the calling party) attempts to call the B subscriber (the called party) using the telephone number associated with the B subscriber (called party) in step 90; the node 40 receives the call and passes the call on to the B subscriber in step 95. Since the called party and the other party (i.e., the C subscriber) are already engaged in conversation, the node 40 will receive an indication that the B subscriber is busy using an internal process in step 100, such that a virtual busy signal is received and a flag 47 is set. The calling party will also receive an indication of these circumstances, in the form of an "audio busy signal" in step 105.

Figure 2:
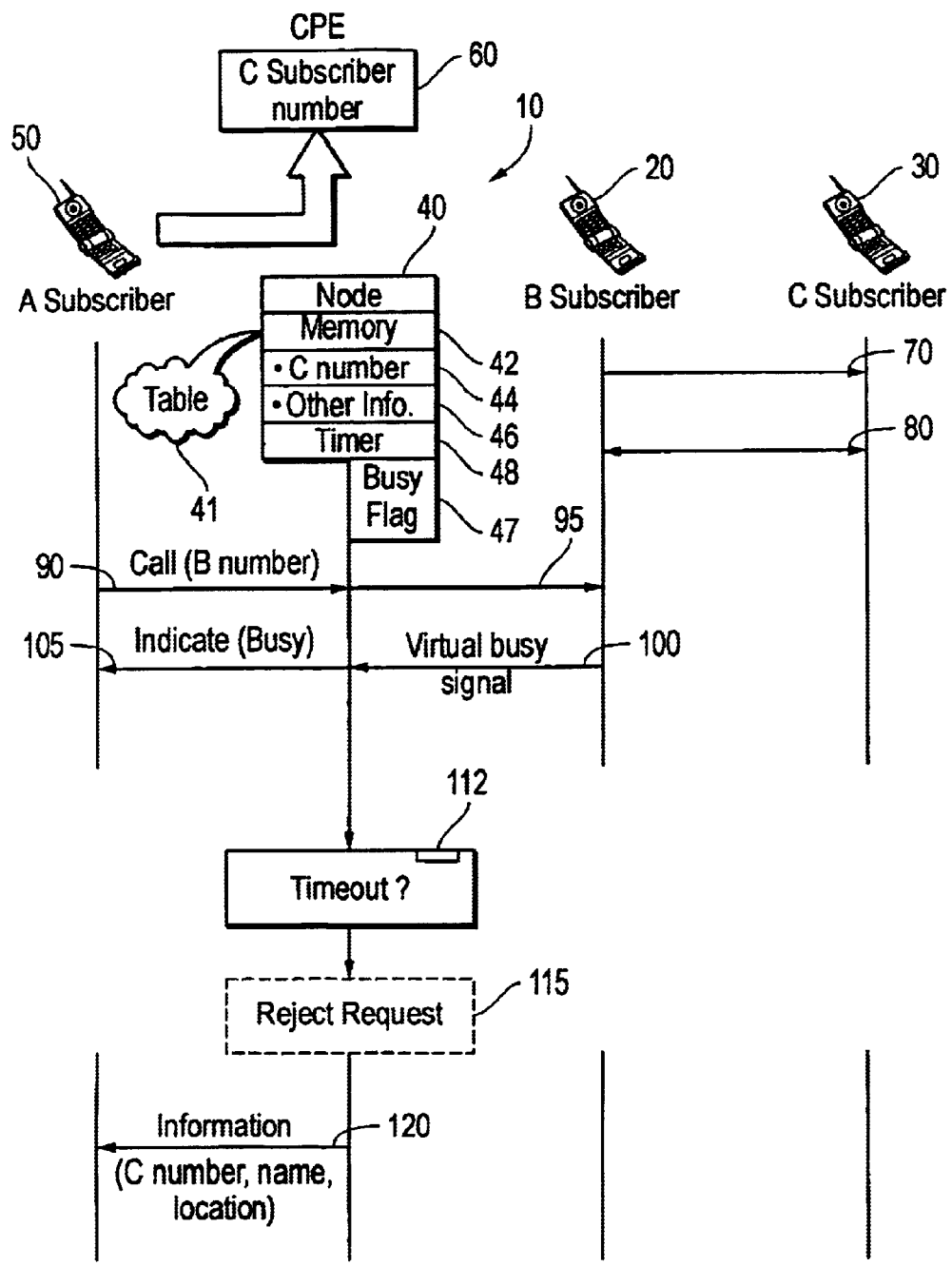
FIG. 2 is a network operational diagram illustrating the apparatus of the present invention.

After the indication that the called party is engaged in communication with the other party is received at the node in step 100 and transmitted to the calling party in some form at step 105, the calling party may elect to send a request to receive identifying information associated with the other party, received at the node 40, typically by entry of a preselected Feature Code, such as "*9#" in step 110. Alternatively, as shown in FIG. 2, the node 40 may include a timer 48 associated with a preselected countdown timeout period. Thus, after receiving an indication at the node 40, such as a "busy" signal (e.g., a "virtual busy signal"), that the called party is engaged in communication with the third party in step 100, the timer 48 may be activated for the preselected countdown timeout period and, at the end of the timeout period, the request to receive the identifying information may be sent and received automatically within the node 40. This may occur in step 112.

The method may be augmented by the ability to reject the request for identifying information from the calling party in step 110 (or as a result of the automatic timeout in step 112) by associating the A, B, and C subscribers with particular information delivery categories. For example, referring to table 1, individual subscribers can be associated with particular categories of telephone service, such as a government phone (e.g., "4"), a police phone (e.g., "3"), a business phone (e.g., "2"), a regular phone (e.g., "1"), or no particular type of phone at all (e.g., "0"), such as when a party refuses to provide a category, or no category is available. The node 40 may determine that the request should be accepted or rejected in step 115 by comparing the identity presented by the A subscriber with the rejection identity provided by the B and C subscribers. In this case, the A subscriber presents its identity to the members of the ongoing call, which are subscribers B and C. Subscribers B and C are associated with rejection identities with regard to comparison and possible rejection of the request for service by the A subscriber. For example, assume that the A subscriber is a policeman attempting to contact the B subscriber, who previously made an emergency call to the police department but failed to remain on the line. Then, prior to the return call by the policeman, the B subscriber phoned the C subscriber, who is an emergency service provider, such as an ambulance service. To determine whether the request for information about the ambulance service should be given to the policeman, the comparison tables 2 and 3 are used. First, the identity presented by the policeman (i.e., "3") is compared to the rejection identity presented by the B subscriber (i.e., "1"). If the identify presented by the A subscriber is greater than the rejection identity of the B subscriber, then information may be delivered to the A subscriber. However, before the information can be delivered, a two-level comparison must be made. The identity presented by the A subscriber must also be compared with the rejection identity presented by the C subscriber. Again, the presentation identity of the A subscriber (i.e., "3") is compared with the rejection identity presented by the C subscriber (i.e., "2"), to verify that the identity presented by the A subscriber is greater than that of the C subscriber.

In this case, the calling identity presented by the A subscriber is greater than the rejection identity presented by either the B or C subscribers. Thus, in essence, the B and C subscribers have given "permission" to the A subscriber to receive identifying information about the C subscriber, currently engaged in conversation with the B subscriber. The method of the invention may also be carried out using explicit permission by the B and C subscribers to present identifying information for the C party to calling party A subscribers. Thus, if both the B and C subscribers permit the identifying information to be sent to the A subscriber, then the identifying information can be passed on by the node 40. However, if either the B subscriber or C subscriber does not permit the identifying information associated with the C subscriber to be transmitted, then the node 40 will block the identifying information to the A subscriber in step 115. Tables 1, 2, and 3 may be stored as Table 41 in the node 40, as shown in FIGS. 1 and 2.

TABLE 1

|                  | Service A | Service B |
|------------------|-----------|-----------|
| Not Provide      | 0         | 0         |
| Ordinary Phone   | 1         | 1         |
| Business Phone   | 2         | 2         |
| Police Phone     | 3         | 3         |
| Government Phone | 4         | 4         |

TABLE 2

| Service A<br>A Subscriber | Service B<br>B Subscriber | Deliver<br>Information |
|---|---|---|
| 0 | 0 | NO  |
| 1 | 0 | YES |
| 2 | 0 | YES |
| 3 | 0 | YES |
| 4 | 0 | YES |
| 0 | 1 | NO  |
| 1 | 1 | NO  |
| 2 | 1 | YES |
| 3 | 1 | YES |
| 4 | 1 | YES |
| 0 | 2 | NO  |
| 1 | 2 | NO  |
| 2 | 2 | NO  |
| 3 | 2 | YES |
| 4 | 2 | YES |
| 0 | 3 | NO  |
| 1 | 3 | NO  |
| 2 | 3 | NO  |
| 3 | 3 | NO  |
| 4 | 3 | YES |
| 0 | 4 | NO  |
| 1 | 4 | NO  |
| 2 | 4 | NO  |
| 3 | 4 | NO  |
| 4 | 4 | NO  |

TABLE 3

| Service A<br>A Subscriber | Service B<br>C Subscriber | Deliver<br>Information |
|---|---|---|
| 0 | 0 | NO  |
| 1 | 0 | YES |
| 2 | 0 | YES |
| 3 | 0 | YES |
| 4 | 0 | YES |
| 0 | 1 | NO  |
| 1 | 1 | NO  |
| 2 | 1 | YES |
| 3 | 1 | YES |
| 4 | 1 | YES |
| 0 | 2 | NO  |
| 1 | 2 | NO  |
| 2 | 2 | NO  |
| 3 | 2 | YES |
| 4 | 2 | YES |
| 0 | 3 | NO  |
| 1 | 3 | NO  |
| 2 | 3 | NO  |
| 3 | 3 | NO  |
| 4 | 3 | YES |
| 0 | 4 | NO  |
| 1 | 4 | NO  |
| 2 | 4 | NO  |
| 3 | 4 | NO  |
| 4 | 4 | NO  |

After the request to receive the identifying information is sent in steps 110, 112 and assuming that the request is not rejected in step 115, the information, in the form of a telephone number, name (e.g., a personal name or business name, or a location and a name, or other information associated with the C subscriber), may be transmitted from the node 40 to the calling party in step 120. Typically, the telephone number (e.g., C number 44), name, and/or location (e.g., other information 46) are stored in a memory 42 included in the node 40. If the request made via steps 110, 112 is rejected in step 115, then the A subscriber will simply be informed that the request is rejected in step 120, instead of receiving the requested information.

For the invention to operate most efficiently, the calling party should have the option to subscribe to the identification service of the invention, or to activate it on a per-use basis using a specific request (e.g., in the form of a Feature Code). Thus, the identification service of the present invention may be activated on-demand, using a Feature Code or other device to send a request to receive the identifying information, or the service can be activated automatically, by subscription, using a timer 48 within the node 40, or within the telephone 50 (not shown). Typical timeout periods might be based on the number of busy signals received (and counted by the timer) or a period of time during which busy signals are received, such as about two to about five seconds.

The calling party should also have some form of CPE device to display the identifying information in the form of a telephone number, name, or other information, such as location. Typically, such information will be shown to the calling party on a display 60, which forms an integral part of the telephone 50.

Figure 3:
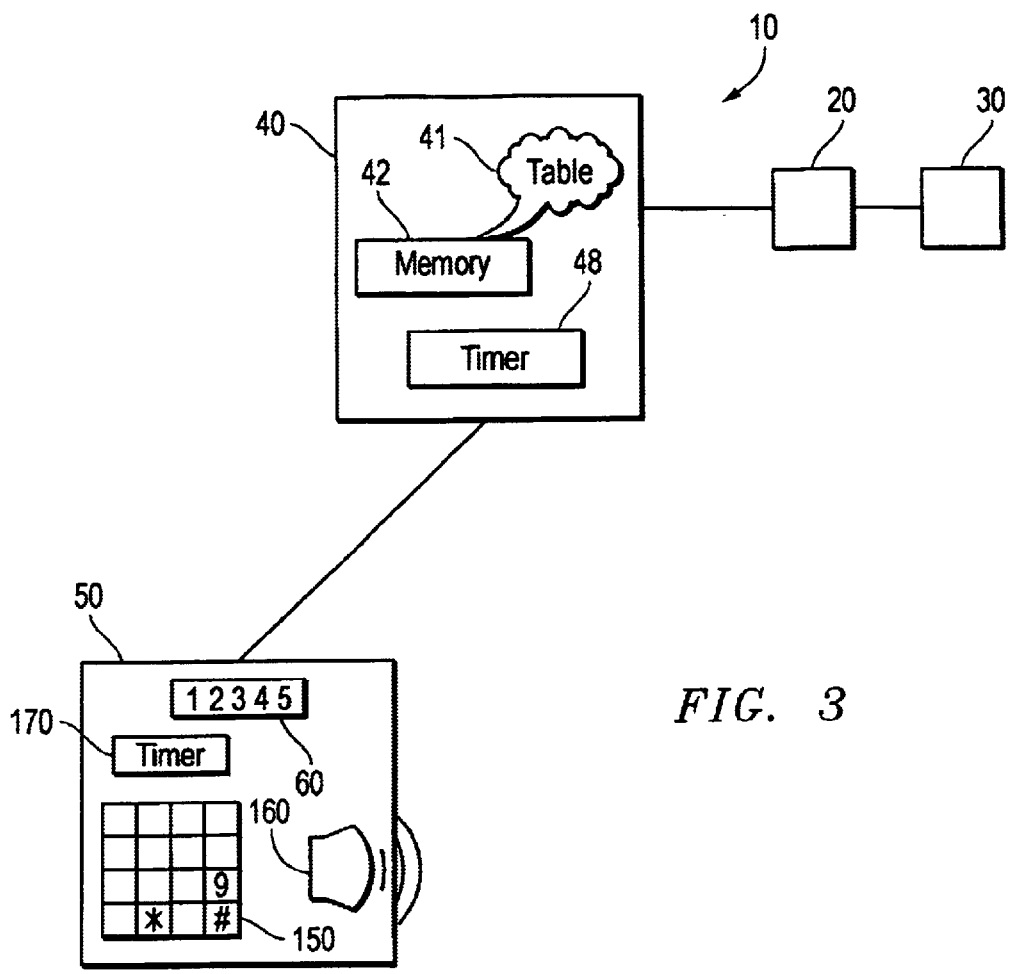
FIG. 3 is a network diagram illustrating a node for identifying a third party engaged in communication with a called party.

The invention may also be embodied in an apparatus, such as a node, for identifying a third party engaged in communication with a called party, as shown in FIG. 3. In this case, it can be seen that the apparatus typically operates within a telecommunications network 10, and may be embodied by various elements therein. For example, the apparatus may include a node 40 communicating with a calling party telephone 50, a called party telephone 20, and the other party telephone 30. The node 40 may be a switch, such as a Mobile Switching Center.

A speaker 160, or a display 60 may be used for giving an indication that the called party is engaged in communication with an other party. Thus, audio announcements and/or visual messages may be used to indicate that the called party is engaged in communication with the other party. Reception of a busy signal (i.e. a "virtual busy signal") at the node 40 may also constitute such an indication. The request to receive identifying information may be effected using a keypad 150, or the telephone 50 in electronic communication with the node 40. The keypad 150, speaker 160, and display 60 typically form an integral part of the telephone 50. If the process of requesting identifying information is automated, as described above, then a timer 48 included in the node 40, or a timer 170 included in the telephone 50, may be used to set the time during which the calling party waits after the indication that the called party is engaged in communication with a third party is received, and the time when a request to receive the identifying information is sent/received (i.e., the preselected timeout period associated with the timer 48, 170). The timer 48, 170 may also be used to count the number of indications, or events (e.g., busy signals or other internal node process indications) which are received to indicate the called party is engaged in communication with the other party before the request to receive the identifying information is sent.

Identifying information may be received using the telephone 50, the display 60, and/or the speaker 160. In the case of the speaker 160, the identifying information, such as the telephone number of the C subscriber (the other party) may be announced to the A subscriber (the calling party).

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A method of identifying an other party engaged in communication with a called party to a calling party, wherein the other party is associated with an identifying information, comprising the steps of:
   receiving a call for the called party from the calling party;
   receiving an indication that the called party is engaged in communication with the other party;
   receiving a request for the identifying information; determining whether the calling party is authorized to receive the identifying information and
   sending the identifying information to the calling party.

2. The method of claim 1, wherein the indication is a busy signal.

3. The method of claim 1, wherein the request includes a feature code.

4. The method of claim 1, wherein the identifying information includes a telephone number.

5. The method of claim 1, wherein the identifying information includes a name.

6. The method of claim 1, wherein the identifying information includes a location and a name.

7. The method of claim 1, wherein the called party is associated with a telephone number and wherein the step of receiving a call for the called party from the calling party includes the step of dialing the telephone number associated with the called party.

8. The method of claim 1, wherein the step of receiving an indication that the called party is engaged in conversation with the other party includes the step of receiving a busy signal.

9. The method of claim 1, wherein the communication between the called party and the other party occurs within a telecommunications network including a node serving the calling party, and wherein the step of receiving a request for the identifying information includes the step of receiving a preselected feature code at the node.

10. The method of claim 9, wherein the step of sending the identifying information to the calling party includes the step of sending the identifying information from the node to the calling party.

11. The method of claim 1, wherein the communication between the called party and the other party occurs within a telecommunications network including a node serving the calling party, wherein the node includes a timer associated with a preselected timeout period, and wherein the step of receiving a request for the identifying information further includes the steps of:
   waiting for the preselected timeout period; and
   requesting the identifying information associated with the other party.

12. The method of claim 1, wherein the step of sending the identifying information to the calling party includes the step of sending a telephone number associated with the other party to the calling party.

13. The method of claim 1, wherein the step of sending the identifying information to the calling party includes the step of sending a name associated with the other party to the calling party.

14. A method of identifying an other party engaged in communication with a called party to a calling party, wherein the other party is associated with an identifying information, comprising the steps of:
   receiving a call for the called party from the calling party;
   receiving an indication that the called party is engaged in communication with the other party;
   receiving a request for the identifying information; and
   comparing a subscriber identity presentation for the calling party with a subscriber identity presentation for the called party and a subscriber identity presentation for the other party to determine whether the identifying information will be sent to the calling party.

15. The method of claim 14, further including the step of:
   rejecting the request for the identifying information.

16. The method of claim 14, further including the step of:
   sending the identifying information to the calling party.

17. An apparatus for identifying an other party engaged in communication with a called party to a calling party, wherein the other party is associated with an identifying information, comprising:
   a node for receiving a call for the called party from the calling party, receiving an indication that the called party is engaged in communication with the other party, receiving a request for the identifying information, receiving the identifying information, determining whether the calling party is authorized to receive the identifying information and sending the identifying information to the calling party.

18. The apparatus of claim 17, wherein the node includes a timer.

19. The apparatus of claim 18, wherein the timer has a preselected timeout period which measures the time between receiving the indication that the called party is engaged in communication with the other party and receiving the request for the identifying information.

20. The apparatus of claim 18, wherein the timer counts a number of events received indicating that the called party is engaged in communication with the other party.

* * * * *